US012716572B2

(12) United States Patent
Lan et al.

(10) Patent No.: US 12,716,572 B2
(45) Date of Patent: Aug. 25, 2026

(54) WALL LAMP

(71) Applicant: Shenzhen Guanke Technologies Co., Ltd, Shenzhen (CN)

(72) Inventors: Qing Lan, Shenzhen (CN); Ligen Liu, Shenzhen (CN); Fudong Lv, Shenzhen (CN); Qinwan Gong, Shenzhen (CN)

(73) Assignee: Shenzhen Guanke Technologies Co., Ltd, Shenzhen (CN)

( * ) Notice: Subject to any disclaimer, the term of this patent is extended or adjusted under 35 U.S.C. 154(b) by 0 days.

(21) Appl. No.: 18/964,868

(22) Filed: Dec. 2, 2024

(65) Prior Publication Data

US 2026/0022819 A1 Jan. 22, 2026

(30) Foreign Application Priority Data

Jul. 16, 2024 (CN) ........................ 202410956598.5

(51) Int. Cl.

| | |
|---|---|
| ***F21V 14/06*** | (2006.01) |
| ***F21S 8/00*** | (2006.01) |
| ***F21V 15/01*** | (2006.01) |
| ***F21V 23/00*** | (2015.01) |
| ***F21V 23/04*** | (2006.01) |
| ***F21V 31/00*** | (2006.01) |

(52) U.S. Cl.

CPC .............. *F21V 14/06* (2013.01); *F21S 8/033* (2013.01); *F21V 15/01* (2013.01); *F21V 23/002* (2013.01); *F21V 23/04* (2013.01); *F21V 31/005* (2013.01)

(58) Field of Classification Search

CPC ........ F21V 14/06; F21V 15/01; F21V 23/002; F21V 23/04; F21V 31/005; F21S 8/033

See application file for complete search history.

(56) References Cited

U.S. PATENT DOCUMENTS

| | | | | |
|---|---|---|---|---|
| 1,886,542 | A * | 11/1932 | Haire | F21V 14/02 362/227 |
| 11,209,137 | B2 * | 12/2021 | Shen | F21V 19/003 |
| 2011/0080736 | A1 * | 4/2011 | Brands | F21L 4/005 362/277 |
| 2016/0138783 | A1 * | 5/2016 | Friedland | F21V 9/04 362/268 |
| 2020/0408391 | A1 * | 12/2020 | Maghnagi | F21V 21/26 |
| 2021/0262644 | A1 * | 8/2021 | Sheehy | F21V 23/002 |

FOREIGN PATENT DOCUMENTS

CN 207962547 U * 10/2018

* cited by examiner

*Primary Examiner* — Tsion Tumebo

(74) *Attorney, Agent, or Firm* — Maier & Maier, PLLC

(57) ABSTRACT

A wall lamp, including a housing, a light-emitting module, a lens, a connecting member, and a transmission member. The housing is provided with a mounting cavity and a limiting hole, and the mounting cavity has at least one light outlet. The light-emitting module is provided in the mounting cavity and has a light-emitting side facing the light outlet. The lens is provided between the light-emitting module and the light outlet and is movable in an alignment direction between the light-emitting module and the light outlet. The connecting member is at least partially provided in the mounting cavity and connected to the lens and includes a rack, which extends along the movement direction of the lens. The transmission member is arranged through the limiting hole and includes a first gear engaged with the rack, which is rotatable along a same axis when driven by an external force.

9 Claims, 9 Drawing Sheets

WALL LAMP

CROSS-REFERENCE TO RELATED APPLICATIONS

This application claims the priority of Chinese Patent Application No. 202410956598.5, entitled "WALL LAMP", filed with the China National Intellectual Property Administration on Jul. 16, 2024, which is incorporated herein by reference in its entirety.

TECHNICAL FIELD

The present application relates to the field of lamps, in particular to a wall lamp.

BACKGROUND

A wall lamp is a lamp mounted on a wall, which can be used for indoor or outdoor lighting. However, the wall lamp in the related art has a single light radiation range and light irradiation intensity during use, making it unsuitable for various application scenarios.

SUMMARY

A main purpose of the present application is to provide a wall lamp, aiming to make its light output angle adjustable to enrich the light radiation range and light irradiation intensity and to improve the applicability of the wall lamp to various application scenarios.

In order to realize the above purpose, the wall lamp proposed in the present application comprises:

a housing, the housing being provided with a mounting cavity and a limiting hole, the mounting cavity having at least one light outlet;

a light-emitting module, provided in the mounting cavity, the light-emitting module having a light-emitting side facing the light outlet;

a lens, provided between the light-emitting module and the light outlet and movable in an alignment direction between the light-emitting module and the light outlet;

a connecting member, at least partially provided within the mounting cavity and connected to the lens, the connecting member comprising a rack, which extends along a movement direction of the lens; and a transmission member, arranged through the limiting hole, the transmission member comprising a first gear engaged with the rack, and the transmission member being rotatable along a same axis when driven by an external force.

Other features of the present application and the corresponding beneficial effects are described in later parts of the specification.

The solution and the related product design scheme to the technical problem of this application are as follows: the lens of the wall lamp is set to be movable along the alignment direction between the light-emitting module and the light outlet. Besides, a connecting member and a transmission member are provided, in which the connecting member is connected to the lens and includes a rack, and the transmission member includes a first gear engaged with the rack. When the transmission member is rotated under an external force, the first gear can drive the engaged rack to move, which in turn drives the lens connected with the rack to move. In other words, the adjustment mechanism can drive the lens to move and adjust the distance between the lens and the light-emitting module, so that the distance between the lens and the light-emitting module can make the light angle of the wall lamp change. Therefore, the structure of the wall lamp in this solution allows for adjustable light emission angles, enriching the light radiation range and light irradiation intensity, thus improving the applicability of the wall lamp to various application scenarios.

Figure 1:
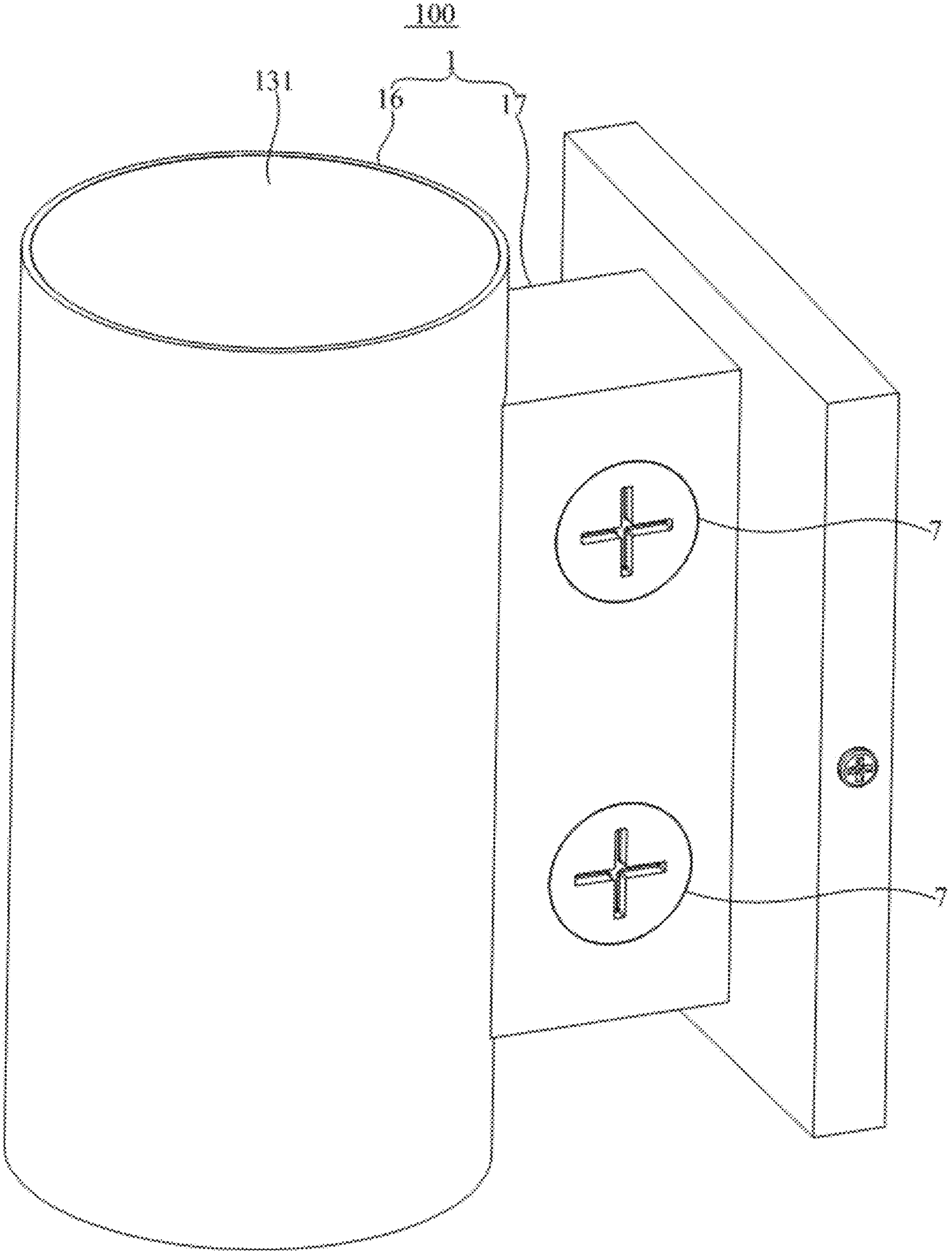
FIG. 1 shows a structural schematic diagram of a wall lamp according to an embodiment of the present application.

The shapes, sizes, proportions, or positional relationships of the product parts shown in the accompanying drawings may be true data of the embodiments and fall within the scope of protection of this application.

DETAILED DESCRIPTION OF THE EMBODIMENTS

In order to make the purpose, technical solutions, and advantages of the present application clearer and more understandable, the following embodiments of the present application are described in further detail by way of specific embodiments in conjunction with the accompanying drawings. It should be understood that the specific embodiments described herein are only for explaining the present application and are not intended to limit the present application.

As shown in FIGS. 1 to 5, and FIG. 8, the present application proposes a wall lamp 100. In an embodiment of the present application, the wall lamp 100 proposed in the present application includes a housing 1, a light-emitting module 2, a lens 3, a connecting member 4, and a transmission member 5. The housing 1 is provided with a mounting cavity 11 and a limiting hole 12, and the mounting cavity 11 is provided with at least one light outlet 13. The light-emitting module 2 is disposed inside the mounting cavity 11, and a light-emitting side of the light-emitting module 2 faces toward the light-emitting side. The lens 3 is provided between the light-emitting module 2 and the light output 13, and is movable in an alignment direction between the light-emitting module 2 and the light output 13. The connecting member 4 is at least partially disposed in the mounting cavity 11 and is connected to the lens 3. The connecting member 4 includes a rack 41, which extends along a movement direction of the lens 3. The transmission member 5 is disposed in the limiting hole 12, which includes a first gear 51 engaged with the rack 41 and is rotatable along a same axis when driven by an external force.

The housing 1 may be used as a mounting carrier for various components of the wall lamp 100, so that the various components in the wall lamp 100 can be assembled to form a whole. Moreover, the housing 1 may also be used to directly or indirectly connect to a wall or other building, thereby mounting the wall lamp 100 on the wall or other building. The connection between the housing 1 and the wall or other building may be a screw connection, or of course, a snap connection, etc., and the present application does not limit the connection between the housing 1 and the wall or other building. The housing 1 may include a barrel portion 16 and a side convex portion 17 as described below, or of course, it may include only the barrel portion 16, and the present application does not limit the shape and structure of the housing 1. In addition, the mounting cavity 11 on the housing 1 may be configured to accommodate the light-emitting module 2, the light outlet 13 may be used for the light emitted by the light-emitting module 2 to be ejected, and the limiting hole 12 may be configured to mount and limit the transmission member 5, so that the transmission member 5 can only be rotated.

The light-emitting module 2 may emit light after being energized. The light-emitting module 2 may include a mounting platform 21, a light board 22, and a light source 23 as described below. Of course, it may only include the light source 23. The light source 23 may be an LED lamp bead, which can not only improve the energy-saving and environmentally friendly nature, but also make the light source 23 smaller in size and help to improve the convenience of the installation and arrangement of the light source 23 in a limited space. Of course, the light source 23 may also be a lamp tube or incandescent lamp. It can be seen that the present application does not limit the type of structure of the light-emitting module 2. In addition, the number of light-emitting modules 2 may be one, or of course two or more, and may be set corresponding to the number of light outlets 13.

The lens 3 may make the light emitted from the light-emitting module 2 more focused and uniform so as to improve the lighting effect of the wall lamp 100. The number of lenses 3 may be one, or of course two or more, and specifically may be set corresponding to the number of light outlets 13 and light-emitting modules 2.

The connecting member 4 may be connected to the lens 3 and is provided with a rack 41 to cooperate with the transmission member 5 in a driven manner, so that it can be driven by the transmission member 5 to move, thereby driving the lens 3 to move. The connecting member 4 and the lens 3 may be a one-piece structure to improve the stability of the connection between the two and the stability of the movement of the lens 3. Besides, the number of components of the wall lamp 100 may also be simplified to improve the convenience of its manufacture and assembly. Of course, in other embodiments, the connecting member 4 and the lens 3 may also be a separate structure, and they are connected by any means such as screw connection or snap connection. In addition, the connecting member 4 may be wholly provided in the mounting cavity 11, or of course may be partially provided in the mounting cavity 11, and the present application does not limit the location where the connecting member 4 is provided.

The transmission member 5 may be driven by an external force and connected to the rack 41 on the connecting member 4 in a transmission manner by the first gear 51, so as to drive the rack 41 to move when rotating. The transmission member 5 may be provided inside the mounting cavity 11, or of course, may be provided outside the mounting cavity 11, and the present application does not limit the location where the transmission member 5 is provided. In addition, the driving member 5 may be driven by the user with bare hands, or may be driven by the adapted workpiece, or may be driven by a motor.

As shown in FIGS. 4 to 7, in an embodiment of the present application, the connecting member 4 and the first gear 51 are provided in the mounting cavity 11. The housing 1 is also provided with an adjusting cavity 14, which is at least in communication with the mounting cavity 11 through the limiting holes 12. The transmission member 5 further includes a second gear 52, which is provided in the adjusting cavity 14. A wall of the adjusting cavity 14 is provided with a rotation hole 141, and the wall lamp further includes a driving member 6, which is rotatably arranged through the rotation hole 141. The driving member 6 includes a third gear 61 engaged with the second gear 52, and a rotation axis of the driving member 6 intersects with a rotation axis of the transmission member 5.

In this embodiment, a driving member 6 is further provided, and a rotation axis of the driving member 6 intersects with the rotation axis of the transmission member 5, so as to improve the compactness of the distribution between the transmission member 5 and the driving member 6, which in turn facilitates the mounting arrangement of the transmission member 5 and the driving member 6 on the housing 1. Besides, it is also convenient that the driving member 6 can have a better operation orientation, which improves the convenience for the user to perform rotation operation thereof. In addition, by providing both the connecting member 4 and the first gear 51 in the mounting cavity 11, it can be convenient to maintain the overall sealing of the wall lamp and reduce the possibility of damage occurring due to water and moisture ingress into the wall lamp. In addition, the driving member 6 may be driven by the user's bare hands, or may be driven by an adapted workpiece, or may be driven by a motor.

Figure 6:
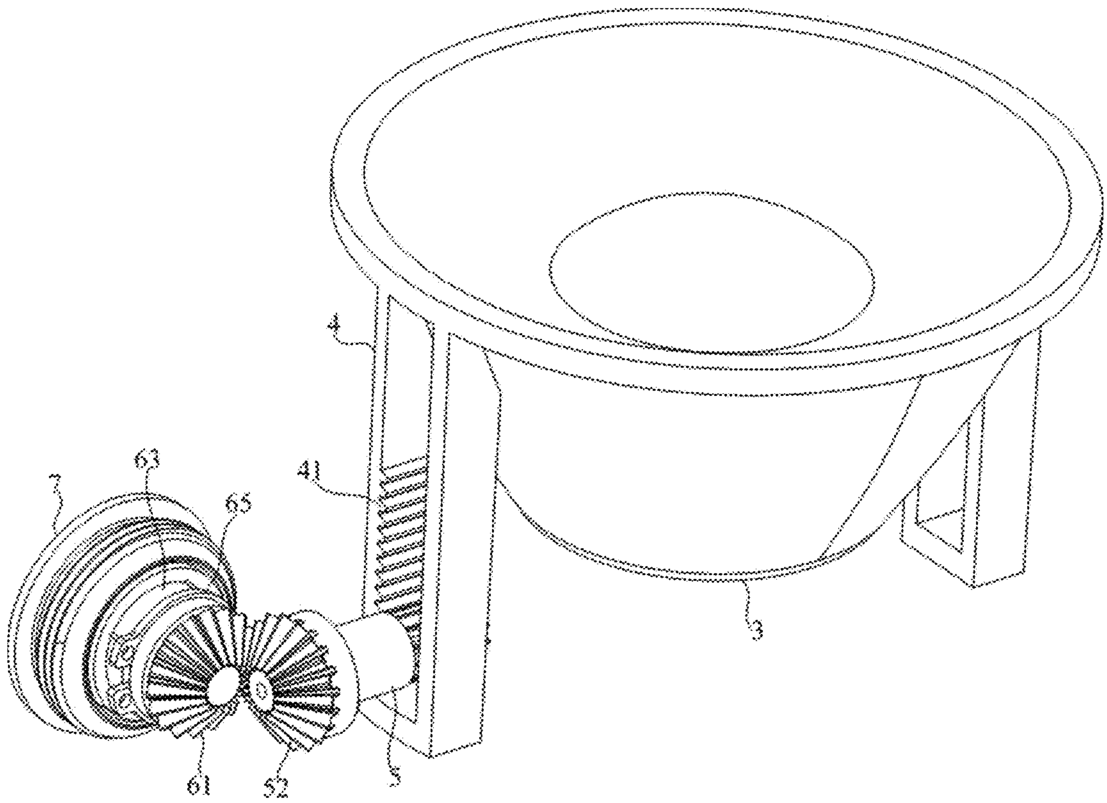
FIG. 6 shows a partial structural diagram of the wall lamp in FIG. 5.
Figure 7:
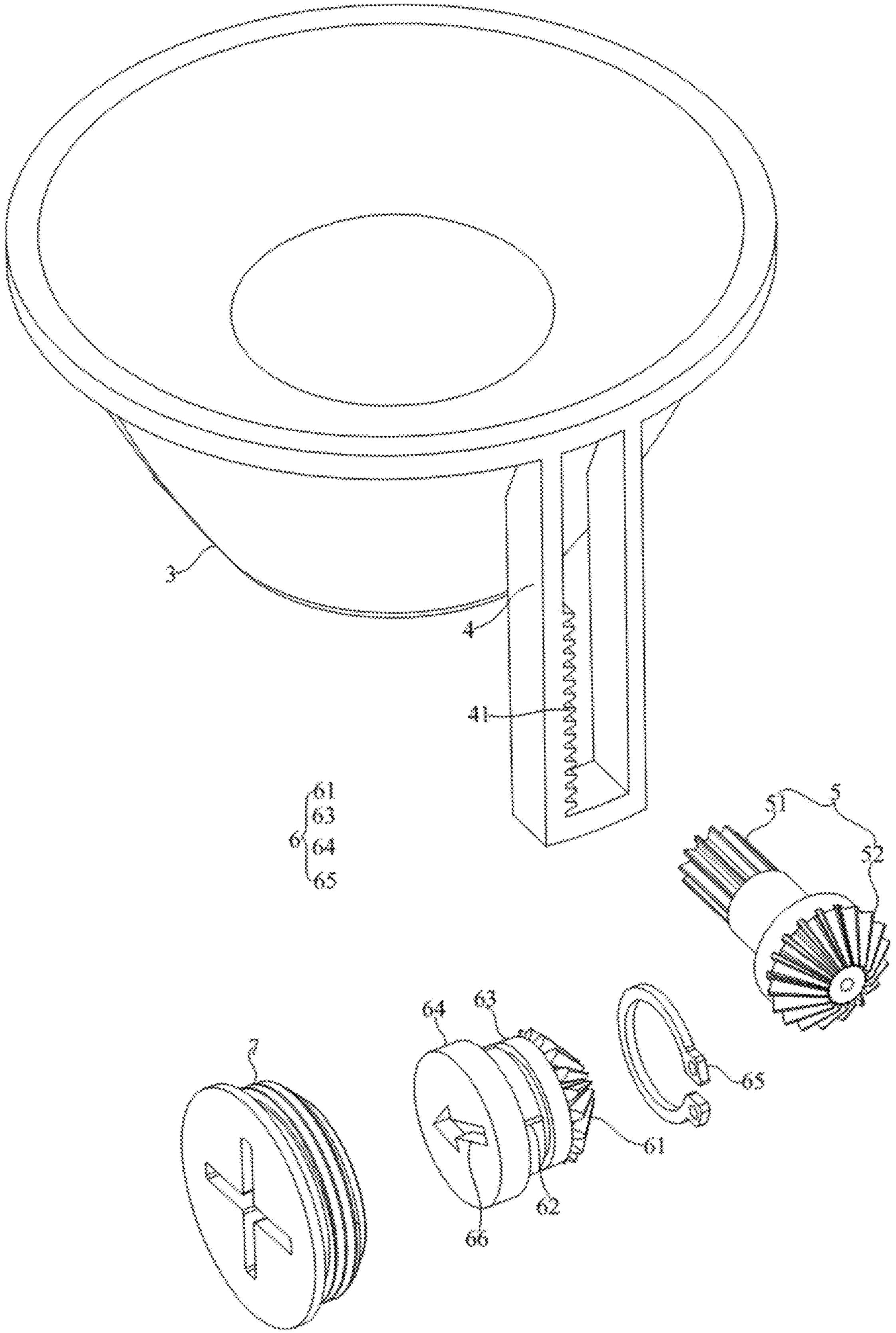
FIG. 7 shows an exploded view of the wall lamp in FIG. 6.
Figure 8:
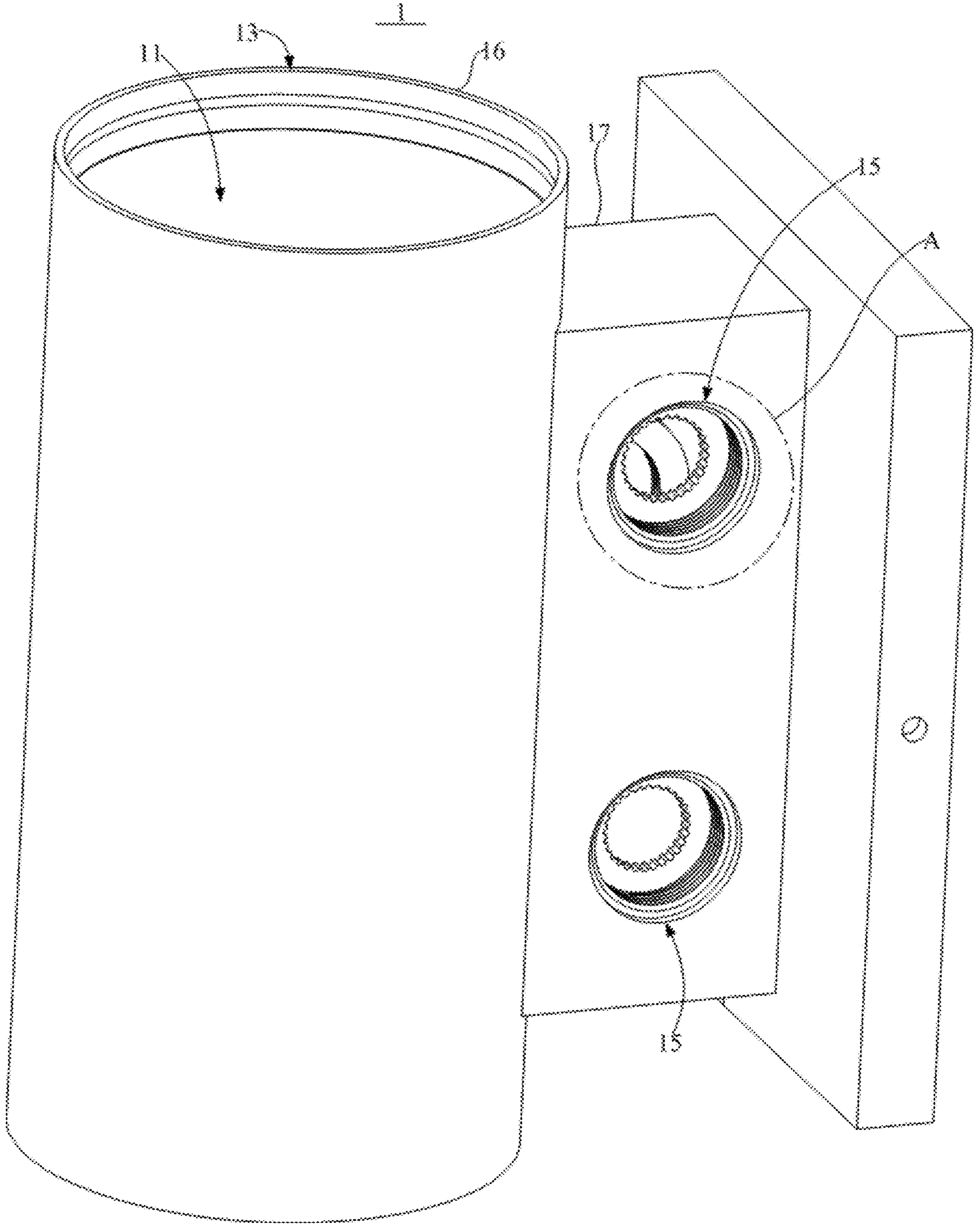
FIG. 8 shows a structural schematic diagram of a housing of the wall lamp in FIG. 5.
Figure 9:
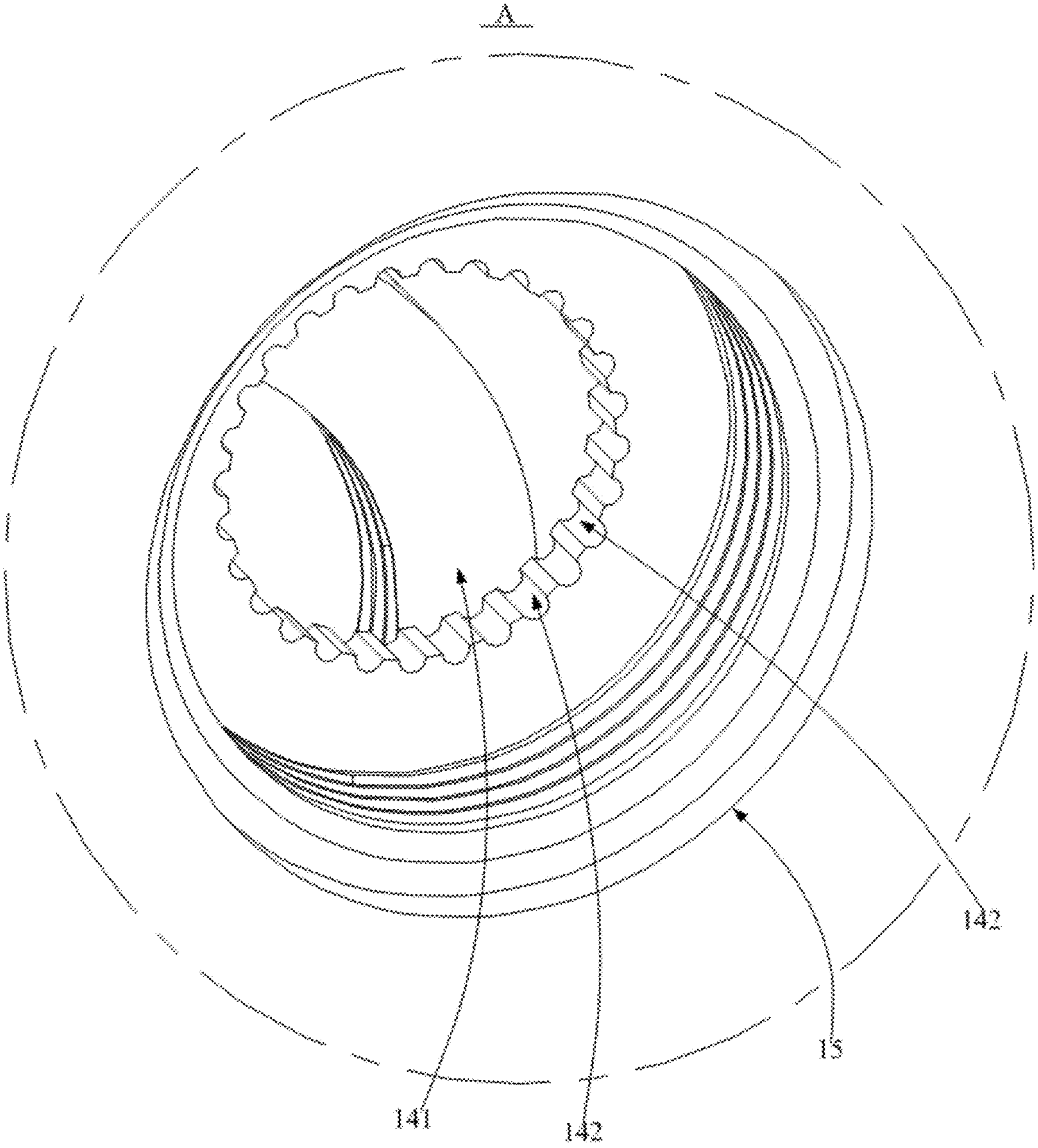
FIG. 9 shows a partially enlarged view of A in FIG. 8.

Referring to FIGS. 6 and 7, in an embodiment of the present application, the second gear 52 and the third gear 61 are bevel gears, and the rotation axis of the driving member 6 is perpendicular to the rotation axis of the transmission member 5.

In this embodiment, setting both the second gear 52 and the third gear 61 as bevel gears can not only facilitate stable meshing of the two, but also realize that the rotation axis of the driving member 6 and the rotation axis of the transmission member 5 are perpendicular to each other, so as to further improve the compactness and regularity of distribution of the driving member 6 and the transmission member 5.

Figure 4:
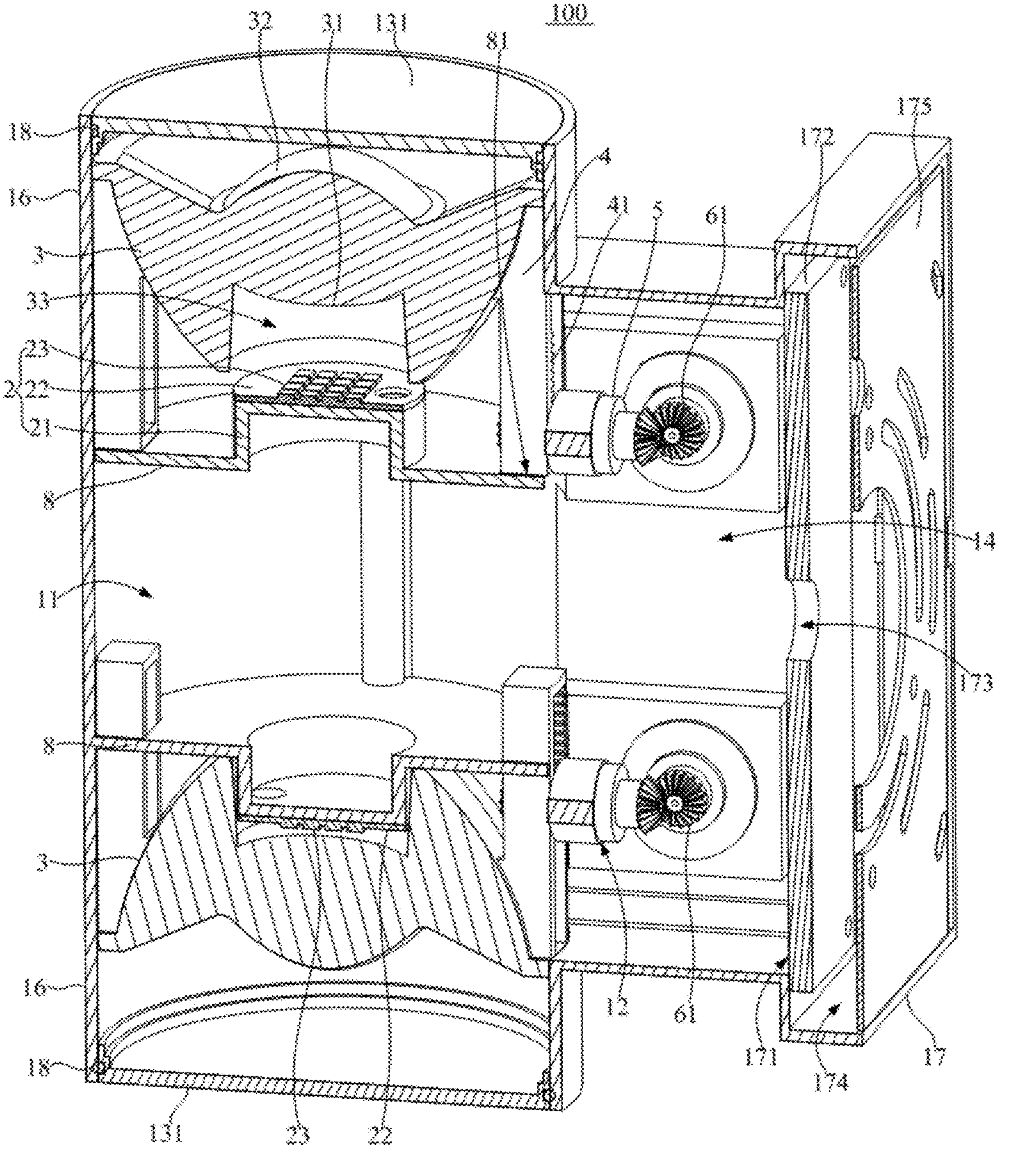
FIG. 4 shows another sectional view of the wall lamp in FIG. 1.
Figure 5:
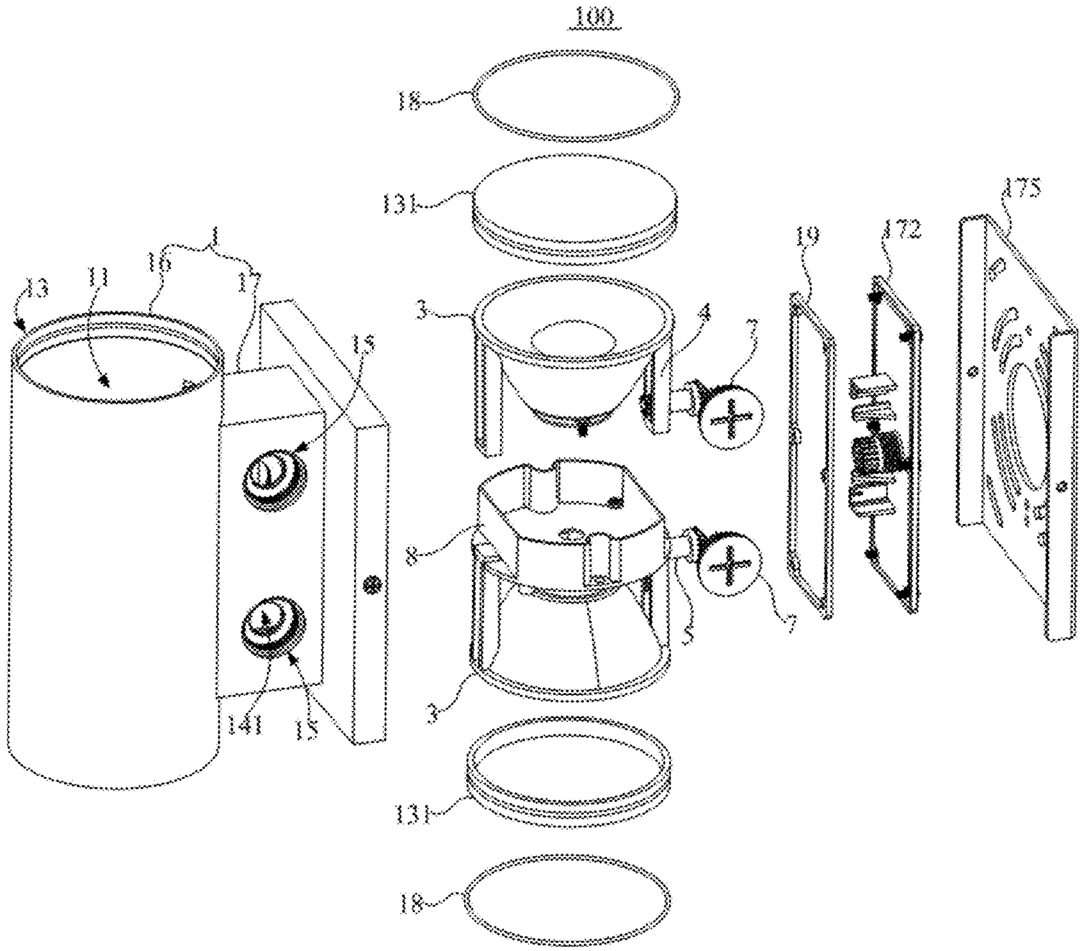
FIG. 5 shows an exploded view of the wall lamp in FIG. 1.

Referring to FIGS. 4 and 5, in an embodiment of the present application, the light outlet 13 is provided with a light-transmitting cover 131, and a first sealing member 18 is provided between the light-transmitting cover 131 and the housing 1.

In this embodiment, the light-transmitting cover 131 and the first sealing member 18 can seal the light outlet 13 to further improve the sealing effect of the wall lamp and reduce the possibility of the wall lamp being exposed to water and moisture. The material of the light-transmitting cover 131 may be made of PC material. Of course, it may also be made of acrylic material, and the present application does not limit the material of the light-transmitting cover 131, as long as it can be used for light transmittance. In addition, the number of light-transmitting covers 131 may be set corresponding to the number of light outlets 13. The light-transmitting cover 131 may be connected to the housing 1 by means of an interference fit with the light outlet 13, or of course by means of a screw connection or a snap connection, and the present application does not limit the connection method of the light-transmitting cover 131 on the housing 1. In addition, the first sealing member 18 may be a rubber member or a silicone member so that the first sealing member 18 may undergo elastic deformation and be pressed against the light-transmitting cover 131 and the housing 1 after being extruded, further improving the sealing effect between the light-transmitting cover 131 and the housing 1. Furthermore, the first sealing member 18 may be disposed around the light outlet 13 and may be disposed within the light outlet 13, or may be disposed on the outside of the light outlet 13.

Referring to FIGS. 5 to 9, in an embodiment of the present application, the wall of the rotation hole 141 is provided with a plurality of limiting slots 142, which are arranged sequentially along a circumferential direction of the rotation hole 141. The driving member 6 is provided with limiting ribs 62, which are embedded in any one of the limiting slots 142.

In this embodiment, the limiting ribs 62 and the limiting slot 142 are provided to facilitate the driving member 6 to maintain the limit position after being rotated into place, so that the lens 3 is stably in the adjusted position. The number of the limiting ribs 62 may be one, or of course, two or more, and they are provided at intervals along the circumferential direction of the driving member 6. Of course, in other embodiments, it is also possible to limit the rotated driving member 6 by friction between the driving member 6 and the wall of the rotating bore 141.

Referring to FIGS. 6 and 7, in an embodiment of the present application, the driving member 6 further includes a main body shaft 63, a stop head 64, and a snap ring 65 sleeved on the main body shaft 63. The third gear 61 is disposed at an end of the main body shaft 63, and the main body shaft 63 is rotatably arranged through the rotation hole 141. The snap ring 65 is disposed at an inner side of the adjusting cavity 14, and the stop head 64 is disposed at an outer side of the adjusting cavity 14. The snap ring 65 and the stop head 64 are cooperatively snap-fitted to the housing 1.

In this embodiment, the driving member 6 includes the main body shaft 63, the stop head 64, and the snap ring 65, so that the driving member 6 can be installed on the housing 1 in a relatively simple threading installation, which is conducive to improving the convenience of the installation of the driving member 6 on the housing 1. The third gear 61 described above may be connected to an end of the main body shaft 63 away from the stop head 64, and the limiting ribs 62 may be provided on a side circumference of the main body shaft 63.

Referring to FIG. 7, in an embodiment of the present application, the outer surface of the housing 1 is provided with a plurality of angle markings, which are disposed sequentially along the circumferential direction of the rotation hole 141. The driving member 6 disposed outside of the adjusting cavity 14 is provided with an indication marking 66, which is configured to correspondingly cooperate with any one of the angle markings.

In the present embodiment, the angle markings and the indication marking 66 are provided so that when the user adjusts the light output angle of the wall lamp 100 by rotating the driving member 6, the user can quickly observe the value of the light output angle of the wall lamp 100 on the basis of the angle marking corresponding to the indication marking 66, which in turn is conducive to improving the convenience and accuracy of the adjustment of the light output angle of the wall lamp 100. The angle marking may be a value of the light output angle of the wall lamp 100, for example, 30°, 35°, 40°, 45°, 50°, 55°, 60°, 65°, or 70°, and the like. The indication marking 66 may be an arrow, or of course a triangle or a straight line, etc., and the present application does not limit the type of structure of the indication mark 66. In addition, in the case where the driving member 6 includes the main body shaft 63 and the stop head 64 as described above, the indication marking 66 may be provided on an end surface of the stop head 64 at an end away from the main body shaft 63.

Referring to FIGS. 1 and 5 to 7, in an embodiment of the present application, the outer surface of the housing 1 is further provided with an adjusting slot 15, and an end of the rotation hole 141 far away from the adjusting cavity 14 is arranged through the wall of the adjusting slot 15 directly opposite to its opening. The wall lamp further includes a blocking member 7, which is detachably provided in the adjusting slot 15.

In this embodiment, the adjusting slot 15 and the blocking member 7 are provided so that when there is no need to adjust the light output angle of the wall lamp 100, the adjusting slot 15 can be blocked by the blocking member 7. Thus, the driving member 6 can be protected, reducing the possibility of the driving member 6 being damaged by external objects. Besides, it also reduces the possibility that the light output angle of the wall lamp 100 may be altered if the driving member 6 is driven arbitrarily, so as to improve the reliability of the operation of the wall lamp 100. In addition, the provision of the blocking member 7 also improves the sealing effect to further reduce the possibility of the wall lamp 100 being damaged by water and moisture. Moreover, it is also conducive to improving the aesthetics of the appearance of the wall lamp 100 so as to improve the subsequent competitiveness of the wall lamp 100 in the market. Furthermore, the walls of the blocking member 7 and the adjustment groove 15 may be threaded, so as to make the connection of the blocking member 7 simpler and more reliable. Of course, in other embodiments, the blocking member 7 and the groove wall of the adjusting slot 15 may also be connected by snap fasteners or the like.

Figure 3:
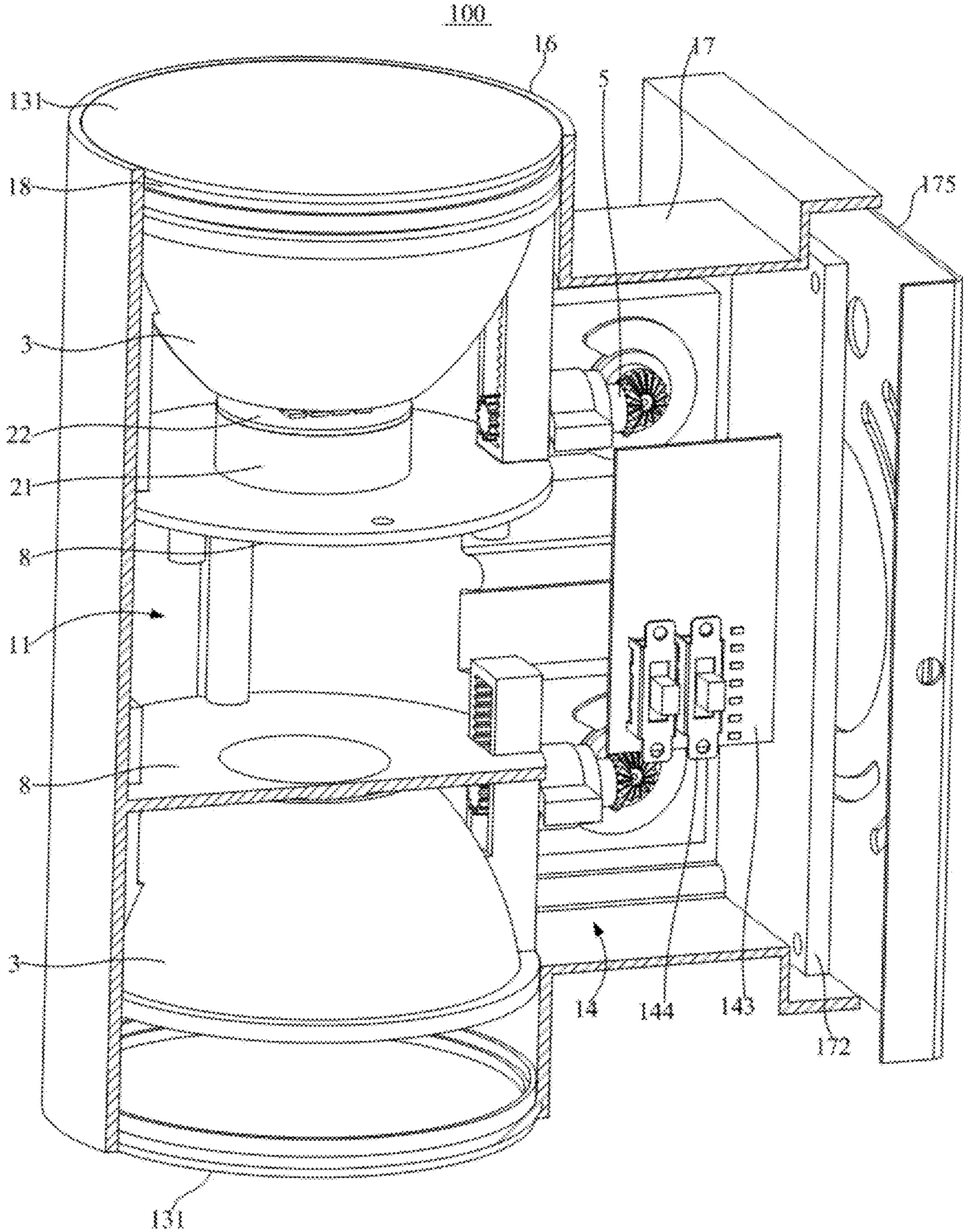
FIG. 3 shows a sectional view of the wall lamp in FIG. 1.

Referring to FIGS. 1, 3, and 4, in an embodiment of the present application, the housing 1 includes a barrel portion 16 and a side convex portion 17. The barrel portion 16 extends in the sliding direction (i.e. movement direction) of the lens 3, and encloses to form the mounting cavity 11. The side convex portion 17 is connected to a side of the barrel portion 16, and encloses to form the adjusting cavity 14. The adjusting cavity 14 is provided with a color temperature and power adjusting switch 144, and the side convex portion 17 is provided with an opening corresponding to the adjustment switch.

In this embodiment, the housing 1 is set to include a barrel portion 16 and a side convex portion 17, so that the barrel portion 16 can be adapted to mount the lens 3, i.e., the projection of the barrel portion 16 and the lens 3 on the projection surface perpendicular to the movement direction of the lens 3 may be circular, which is conducive to improving the compactness of the distribution of the two. Besides, the barrel portion 16 has a guiding effect on the sliding of the lens 3. The side surface of the side convex portion 17 is planar, so as to facilitate the installation of the driving member 6, and the installation of the main control board 143 in the adjusting cavity 14. The main control board 143 is further provided with the color temperature and power adjusting switch 144, so as to realize the adjustment of the color temperature and the power of the light-emitting module 2. In addition, the rotation hole 141, the angle marking, and the adjusting slot 15 described above may be provided on the side convex portion 17, and the rotation hole 141 and the opening may be provided on the opposite sides of the side convex portion 17, so that the color temperature and power adjusting switch 144 may also have a better operation orientation to facilitate the operation thereof by the user. In addition, the barrel portion 16 and the side convex portion 17 may be of a one-piece structure to simplify the number of parts of the wall lamp 100 and to improve the convenience of manufacturing and assembling thereof. Meanwhile, the sealing effect of the mounting cavity 11 and the adjusting cavity 14 can also be better ensured.

Referring to FIGS. 1, 4, and 5, in an embodiment of the present application, a side of the side convex portion 17 away from the barrel portion 16 is provided with a mounting opening 171. The wall lamp further includes a cover plate 172, which covers the mounting opening 171 and is provided with a wire passage hole 173 connected to the adjusting cavity 14.

In this embodiment, the mounting opening 171 is provided on the side convex portion 17, so that the transmission member 5 and the main control board 143 can be mounted in the housing 1 through the mounting opening 171, thereby contributing to improving the convenience of mounting the components such as the transmission member 5 and the main control board 143. Further, the cover plate 172 is provided to cover the mounting opening 171 to improve the overall sealing of the wall lamp 100. The wire passage hole 173 on the cover plate 172 facilitates the passage of the wires of the wall lamp 100 and can play a binding and limiting role for the wires. The cover plate 172 may be connected by screws or fasteners to simplify the assembly process of the cover plate 172, and also make the cover plate 172 removable, which in turn improves the convenience of subsequent maintenance of the wall lamp 100.

Referring to FIG. 5, in an embodiment of the present application, the wall lamp further includes a second sealing member 19, which is disposed between the cover plate 172 and the side convex portion 17.

In this embodiment, the second sealing member 19 is provided to provide a sealing effect between the cover plate 172 and the side convex portion 17 to further improve the overall sealing of the wall lamp 100. The second sealing member 19 may be a rubber member or a silicone member, so that the second sealing member 19 may undergo an elastic deformation and be pressed against the cover plate 172 and the side convex portion 17 after being extruded, further improving the sealing effect between the cover plate 172 and the side convex portion 17. In addition, the second sealing member 19 may be disposed around the mounting opening 171, or it may be disposed within the mounting opening 171, or it may be disposed on the outside of the mounting opening 171.

Figure 2:
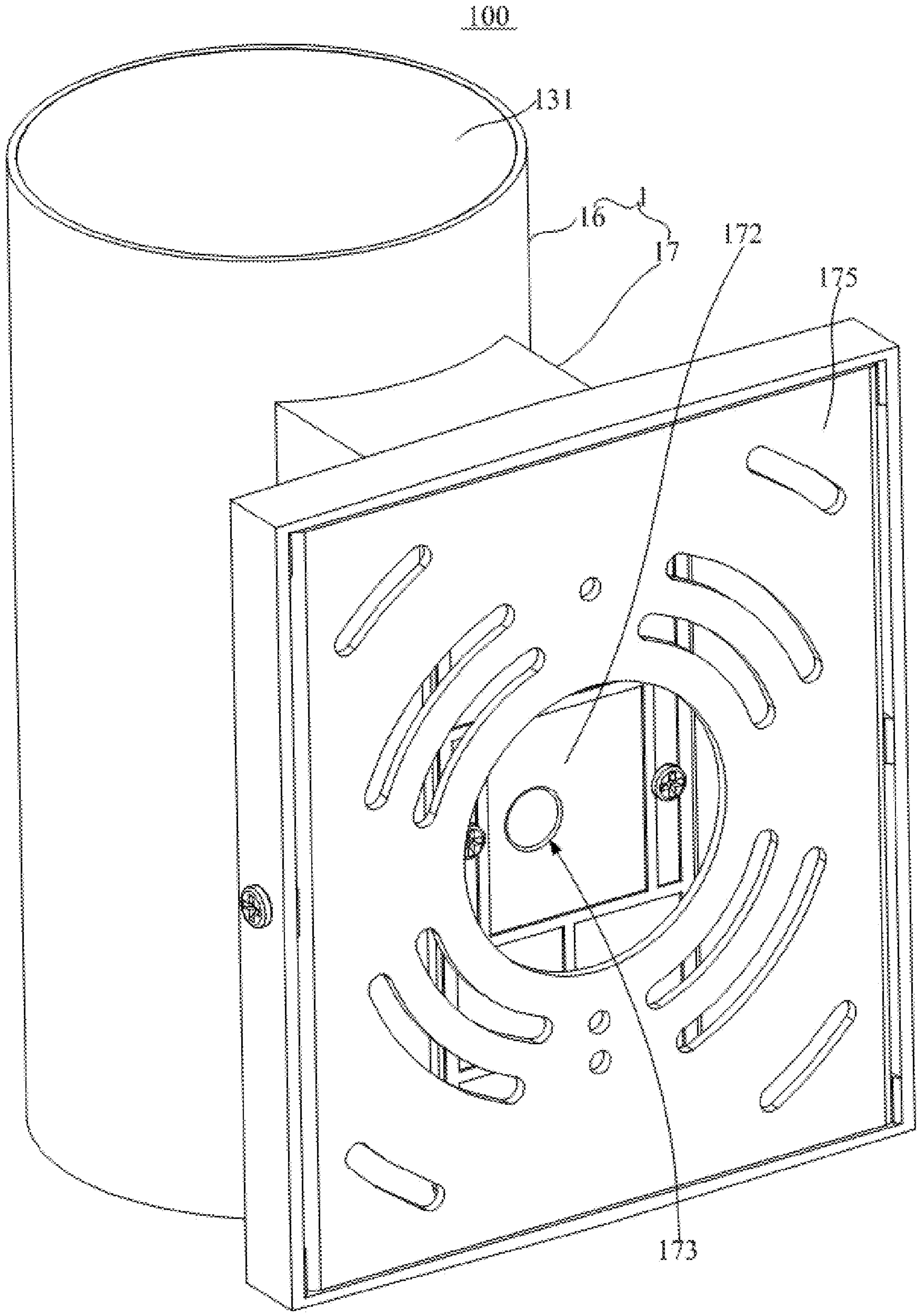
FIG. 2 shows a schematic view of the wall lamp in FIG. 1.

Referring to FIGS. 2, 4, and 5, in an embodiment of the present application, a side of the side convex portion 17 away from the barrel portion 16 is provided with an accommodating slot 174, and an end of the mounting opening 171 away from the adjusting cavity 14 is arranged through the wall of the accommodating slot 174 directly opposite to an opening of the accommodating slot. The wall lamp 100 further includes a mounting plate 175, which is provided inside the accommodating slot 174, and is attached to the wall of the accommodating slot 174 enclosing the opening.

In this embodiment, the mounting plate 175 may be connected to a wall or other building, and the mounting plate 175 is connected to the wall of the accommodating slot 174 enclosing the opening, so as to be convenient for the user to carry out the connection operation on one side of the wall lamp 100, which in turn is conducive to improving the convenience of assembling the housing 1 and the mounting plate 175. The mounting plate 175 and the wall of the accommodating slot 174 enclosing the opening may be connected by screws to further simplify the assembly process and improve the stability of the connection of the housing 1 and the mounting plate 175. Of course, the mounting plate 175 and the side convex portion 17 may be connected by other connection methods such as snap connections. In addition, the second sealing member 19 and the cover plate 172 described above may be provided in the accommodation slot 174.

Referring to FIG. 4, in an embodiment of the present application, the connecting member 4 is provided between the lens 3 and the light-emitting module 2.

In this embodiment, locating the connecting member 4 between the lens 3 and the light-emitting module 2 can make the connecting member 4 conveniently close to the transmission member 5 disposed on the side convex portion 17 of the housing 1, which in turn is conducive to improving the compactness of the distribution of the connecting member 4 and the transmission member 5, thereby improving the convenience of the installation arrangement thereof. Besides, since the lens 3 is usually cone-shaped and has a relatively small cross-section close to the end of the light-emitting module 2, it is also advantageous to fully utilize the space between the lens 3 and the barrel portion 16 of the housing 1 in order to improve the compactness of the distribution of the various components of the wall lamp 100.

Referring to FIG. 4, in an embodiment of the present application, the lens 3 is provided with a first protrusion 31 and a second protrusion 32 at opposite ends of the lens 3. The first protrusion 31 is provided with a curved surface projecting toward the light-emitting module 2, and the second protrusion 32 is provided a curved surface projecting toward the light outlet 13.

In this embodiment, providing the first projection 31 and the second projection 32 at the lens 3 can increase the multiplicity of the dimming angle for the light-emitting module 2. In a projection plane perpendicular to the sliding direction of the lens 3, a projection of the first projection 31 may be disposed on an inner side of a projection of the second projection 32.

Referring to FIG. 4, in an embodiment of the present application, the light-emitting module 2 includes a mounting platform 21, a light board 22, and a light source 23 fixed to the mounting platform 21. The light source 23 is provided toward the lens 3, and the lens 3 is provided with a clearance space 33 corresponding to the mounting platform 21, so that the light source 23 is located within the clearance space 33 when the lens 3 is moved toward the light-emitting module 2.

In this embodiment, the light-emitting module 2 includes the light board 22 and the light source 23, which makes it convenient to provide the light source 23 with a mounting position through the light board 22, which in turn is conducive to improving the convenience of the installation arrangement of the light source 23. Besides, the plurality of light sources 23 may also be electrically connected to the main control board 143 through the light board 22, so that the plurality of light sources 23 and the main control board 143 do not need to be connected one-to-one correspondingly, which is conducive to simplifying the wiring structure between the light-emitting module 2 and the main control board 143. Further, the setting of the mounting platform 21 can provide a mounting position to the light board 22 for mounting the light board 22. Furthermore, the setting of the clearance space 33 on the lens 3 can improve the compactness of the distribution between the light sources 23 and the lens 3 and reduce the possibility of movement interference between the two. In addition, the first projection 31 on the lens 3 as described above may be provided in the clearance space 33.

Referring to FIGS. 4, 5, and 6, in an embodiment of the present application, the number of light outlets 13 is two, AND the two light outlets 13 are located at opposite ends of the housing 1. The number of the light-emitting modules 2, the lenses 3, the transmission members 5, and the connecting members 4 are all two.

In this embodiment, the number of the light outlets 13, the light-emitting modules 2 and the lenses 3 are all set to two, so that the wall lamp 100 can have two directions of light emission to improve the lighting effect. In addition, the two transmission members 5 and the connecting members 4 are provided so that the two lenses 3 can be adjusted separately to improve the flexibility of adjusting the angle of light output at both ends of each wall lamp 100.

Referring to FIG. 4, in an embodiment of the present application, the wall lamp further includes two support members 8, both of which are disposed in the mounting cavity 11 and are spaced apart in the movement direction of the lens 3. One of the two support members 8 and the housing 1 is a one-piece structure, and the other one and the housing 1 is a separate structure. Each light-emitting module 2 is mounted on one of the support members 8, and each support members 8 is provided with a clearance hole 81. The clearance hole 81 is arranged corresponding to the rack 41.

In this embodiment, the two support members 8 make it easier to provide mounting positions for each of the two light-emitting modules 2, which is conducive to improving the installation convenience of the light-emitting modules 2. The spacing of the two support members 8 and the separate setting of one support member 8 and the housing 1 can simplify the components of the wall lamp 100, and it is also convenient to form a space between the split support member 8 and the other support member 8 for installing and setting the battery of the wall lamp 100. In the case where the light-emitting module 2 includes the mounting platform 21, the light board 22, and the light source 23 as described above, the mounting platform 21 may be attached to the support member 8. Also, in the case where the housing 1 includes the barrel portion 16 and the side convex portion 17 as described above, the support member 8 may be disposed in the mounting cavity 11 of the barrel portion 16. In addition, the support member 8 may be of a plate body structure, or of course of a seat body structure, a cover body structure, or the like.

Described above only preferred embodiments of the present application, and are not intended to limit the scope of the patent of the present application. Any equivalent structural transformations made under the inventive concept of the present application, utilizing the contents of the specification of the present application and the accompanying drawings, or directly/indirectly applying them in other related technical fields are included in the scope of the protection of the present application.

What is claimed is:

1. A wall lamp, comprising:

a housing provided with a mounting cavity and a limiting hole, the mounting cavity having at least one light outlet;

a light-emitting module provided in the mounting cavity, the light-emitting module having a light-emitting side facing the light outlet;

a lens provided between the light-emitting module and the light outlet and movable in an alignment direction between the light-emitting module and the light outlet;

a connecting member at least partially disposed within the mounting cavity and connected to the lens, the connecting member comprising a rack which extends along a movement direction of the lens;

a transmission member arranged through the limiting hole, the transmission member comprising a first gear engaged in the rack, and being rotatable along a same axis when driven by an external force; and wherein the connecting member and the first gear are provided in the mounting cavity; the housing is further provided with an adjusting cavity, which is in communication with the mounting cavity at least through the limiting hole; and the transmission member further comprises a second gear, which is provided in the adjusting cavity; and a rotation hole is provided in a cavity wall of the adjusting cavity; and the wall lamp further comprises a driving member, which is rotatably arranged through the rotation hole, and comprises a third gear engaged with the second gear, and a rotation axis of the driving member intersects with a rotation axis of the transmission member.

2. The wall lamp of claim 1, wherein the second gear and the third gear are both bevel gears, and the rotation axis of the driving member is perpendicular to the rotation axis of the transmission member;

and/or, the light outlet is provided with a light-transmitting cover, and a first sealing is provided between the light-transmitting cover and the housing.

3. The wall lamp of claim 1, wherein a hole wall of the rotation hole is provided with a plurality of limiting slots which are sequentially provided along a circumferential direction of the rotation hole; the driving member is provided with a limiting rib, which is embedded in any one of the limiting slots;

and/or, the driving member further comprises a main body shaft, a stop head, and a snap ring sleeved on the main body shaft; the third gear is provided at an end of the main body shaft, and the main body shaft is rotatably arranged through the rotation hole; the snap ring is provided on an inner side of the adjusting cavity, the stop head is provided on an outer side of the adjusting cavity, and the snap ring and the stop head are cooperatively clamped to the housing;

and/or, an outer surface of the housing is provided with a plurality of angle markings, which are disposed sequentially along the circumferential direction of the rotation hole; the driving member arranged outside of the adjusting cavity is provided with an indication marking, which is configured to correspondingly cooperate with any one of the angle markings;

and/or, the outer surface of the housing is further provided with an adjusting slot, an end of the rotation hole away from the adjusting cavity is arranged through a wall of the adjusting slot directly opposite an opening of the adjusting slot; the wall lamp further comprises a blocking member, which is detachably disposed within the adjusting slot.

4. The wall lamp of claim 1, wherein the housing comprises a barrel portion and a side convex portion; the barrel portion extends along the movement direction of the lens, and the barrel portion encloses to form the mounting cavity; the side convex portion is connected to one side of the barrel portion, and the side convex portion encloses to form the adjusting cavity; and the adjusting cavity is provided with a main control board electrically connected to the light-emitting module; the main control board is provided with a color temperature and power adjusting switch, and the side convex portion is provided with an opening corresponding to the color temperature and power adjusting switch.

5. The wall lamp of claim 4, wherein a mounting opening is provided on a side of the side convex portion away from the barrel portion; the wall lamp further comprises a cover plate, which covers the mounting opening and is provided with a wire passage hole in communication with the adjusting cavity;

and/or, the barrel portion and the side convex portion are of a one-piece structure.

6. The wall lamp of claim 5, further comprising a second sealing member, which is provided between the cover plate and the side convex portion;

and/or, an accommodating slot is provided on a side of the side convex portion away from the barrel portion, and an end of the mounting opening away from the adjusting cavity is arranged through a wall of the accommodating slot directly opposite an opening of the accommodating slot; and the wall lamp further comprises a mounting plate, which is provided within the accommodating slot and connected to a wall of the accommodating slot enclosing the opening.

7. The wall lamp of claim 1, wherein opposite ends of the lens are provided with a first protrusion and a second protrusion, respectively; the first protrusion is provided with a curved surface projecting towards the light-emitting module, and the second protrusion is provided with a curved surface projecting towards the light outlet;

and/or, the connecting member and the lens are of a one-piece structure;

and/or, the light-emitting module comprises a mounting platform, a light board fixed to the mounting platform, and a light source, wherein the light source is disposed towards the lens, the lens is provided with a clearance space corresponding to the mounting platform, and the light source is located in the clearance space when the lens is moved towards the light-emitting module.

8. The wall lamp of claim 1, wherein the number of the light outlets is two, and the two light outlets are located at opposite ends of the housing; and the number of the light-emitting modules, the lenses, the transmission members, and the connecting members are all two.

9. The wall lamp of claim 8, further comprising two support members which are disposed in the mounting cavity and spaced apart in the movement direction of the lenses;

one of the two support members and the housing are of a one-piece structure, and the other of the two support members and the housing are of a separate structure; and each of the light-emitting modules is mounted on a respective support member, and each of the support members is provided with a wire passage hole, which is configured corresponding to the rack.

* * * * *